Patented Jan. 6, 1948

2,434,145

UNITED STATES PATENT OFFICE 2,434,145

GLYCOLIC ETHERS OF HYDROXYLATED INTERPOLYMERS AND THEIR PREPARATION

Donald D. Coffman, Wilmington, Del., assignor to E. I. du Pont de Nemours & Company, Wilmington, Del., a corporation of Delaware No Drawing. Application November 30, 1943, Serial No. 512,337

11 Claims. (Cl. 260—90)

This invention relates to new compositions of matter and more particularly to glycolic ethers of hydrolyzed interpolymers of ethylene with vinyl organic esters and to processes for preparing such ethers.

Polymeric alcohols derived by the hydrolysis of interpolymers of ethylene with a vinyl organic ester differ from polyvinyl alcohol in important respects, particularly in being water-insoluble. In many applications, notably in the preparation of fibers and pellicles which are to be subjected to aqueous media, this property of water-insolubility is an important factor which serves to render polymeric alcohols derived by the hydrolysis of said interpolymers more desirable than the commercially available polyvinyl alcohol. However, their water-insolubility renders their application from solution difficult for the reason that to obtain and use solutions thereof one must handle and recover large volumes of expensive non-aqueous solvents. Furthermore, for certain applications, for example, as sizes, tanning agents, emulsifying agents, laundry assistants and plasticizers, the water-insolubility of said hydrolyzed interpolymers is an obvious disadvantage.

It has now been discovered that certain hydrolyzed interpolymers obtained by hydrolyzing an interpolymer of ethylene with a vinyl organic ester may be etherified by selected etherifying agents to provide glycolic ethers of said hydrolyzed interpolymers which are water-soluble. Accordingly, this invention has as an object the provision of water-soluble derivatives of hydrolyzed interpolymers of ethylene with vinyl organic esters. Another object is to provide a simple and inexpensive process for producing derivatives of said hydrolyzed interpolymers. Still another object is to provide water-soluble derivatives of said hydrolyzed interpolymers for use in film-forming compositions. It is also among the particular objects of this invention: to provide water-soluble derivatives of said hydrolyzed interpolymers adapted for use in film form as wrapping foils; to provide water-soluble derivatives of said hydrolyzed interpolymers adapted for use as sizes for textile fibers and paper and as tanning agents; and to provide water-soluble derivatives of said hydrolyzed interpolymers adapted for use as emulsifying agents, as assistants for aliphatic sulfonates in laundering and as plasticizers for cellulose acetate. Additional objects will become apparent from an examination of the following description and claims.

These and other objects and advantages are accomplished by the herein described invention which broadly comprises admixing a hydrolyzed interpolymer of ethylene and a vinyl ester of an organic carboxylic acid with a salt of an alpha halo fatty acid dissolved in an aqueous solution of a base having a basic dissociation constant of at least $2 \times 10^{-5}$, said salt having the general formula

wherein X is a halogen atom having an atomic weight greater than 30, R is a radical selected from the group consisting of hydrogen atoms and monovalent alkyl radicals containing not more than 4 carbon atoms and Z is a cation of a base having a basic dissociation constant of at least $2 \times 10^{-5}$.

In a more restricted sense this invention comprises admixing, at a temperature within the range of from 20° C. to 200° C., a salt of an alpha halo fatty acid dissolved in an aqueous solution of a base having a basic dissociation constant of at least $1 \times 10^{-2}$, said salt having the general formula

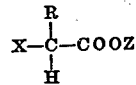

wherein X is a halogen atom having an atomic weight greater than 30, R is a radical selected from the group consisting of hydrogen atoms and monovalent alkyl radicals containing not more than 4 carbon atoms, and Z is a cation of a base having a basic dissociation constant of at least $1 \times 10^{-2}$, with a hydrolyzed interpolymer of ethylene and a vinyl ester of an organic carboxylic acid, said hydrolyzed interpolymer being that had by replacing by hydroxyl groups at least 95% of the ester groups of an interpolymer of ethylene and a vinyl ester of an organic carboxylic acid in which the mol ratio of ethylene to vinyl ester is within the range of from 1/25 to 8/1.

A preferred embodiment of this invention comprises admixing an aqueous potassium hydroxide solution of sodium chloroacetate with a hydrolyzed interpolymer of ethylene and vinyl acetate at a temperature within the range of from 20° C. to 60° C., said hydrolyzed interpolymer being that had by replacing by hydroxyl groups at least 95% of the acetate groups on an interpolymer of ethylene and vinyl acetate in which the mol ratio of ethylene to vinyl acetate is within the range of from 1/25 to 1/1.

The novel products of this invention are glycolic ethers of hydrolyzed interpolymers of ethylene and a vinyl ester of an organic carboxylic acid, said ethers being those had by replacing hydroxyl groups of said hydrolyzed interpolymers by radicals having the general formula

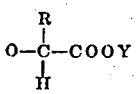

wherein R is a radical selected from the group consisting of hydrogen atoms and monovalent alkyl radicals containing not more than 4 carbon atoms, and Y is a cation selected from the group consisting of hydrogen atoms and salt-forming cations from the group consisting of zinc, aluminum and cations of bases having a basic disassociation constant of at least $2 \times 10^{-5}$.

In a more restricted sense the product of this invention is a water-soluble glycolic ether of a hydrolyzed interpolymer of ethylene and a vinyl ester of an organic carboxylic acid, said ether being that had by replacing by hydroxyl groups at least 95% of the ester groups of an interpolymer of ethylene and a vinyl ester of an organic acid in which the mol ratio of ethylene to vinyl ester is within the range of from 1/25 to 1/1, and replacing from 10% to 60% of the hydroxyl groups of the resultant hydrolyzed interpolymer by radicals having the general formula

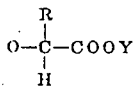

wherein R is a radical selected from the group consisting of hydrogen atoms and monovalent alkyl radicals containing not more than 4 carbon atoms, and Y is a cation selected from the group consisting of hydrogen atoms and cations of bases having a basic dissociation constant of at least $1 \times 10^{-2}$.

A preferred product is a glycolic ether of a hydrolyzed interpolymer of ethylene and vinyl acetate, said ether being that had by replacing by hydroxyl groups at least 95% of the acetate groups of an interpolymer of ethylene and vinyl acetate in which the mol ratio of ethylene to vinyl acetate is within the range of from 1/25 to 1/1, and replacing from 10% to 60% of the hydroxyl groups of the resultant hydrolyzed interpolymer by a radical having the formula $OCH_2COOY$ wherein Y is an alkali metal.

The expression "vinyl organic ester" as employed herein refers to a vinyl ester of an organic carboxylic acid.

Interpolymers of ethylene with a vinyl organic ester useful in this invention, their preparation and the hydrolysis of said interpolymers are described in detail in copending U. S. application Serial No. 446,114, filed June 6, 1942.

Interpolymers of ethylene and a vinyl organic ester useful in this invention are those which are soluble in alcohol or in alcohol-toluene mixtures. Said interpolymers can be prepared most advantageously by copolymerizing ethylene and a vinyl organic ester, for example vinyl acetate, at temperatures of about 100° C. at an ethylene pressure ordinarily below 500 atmospheres in the presence of a peroxygen catalyst. Hydrolysis or alcoholysis of the ethylene/vinyl ester interpolymers may be effected by dissolving the interpolymer in an alcohol such as methanol or ethanol, or in a mixture of an alcohol and a hydrocarbon such as toluene, and then treating with a suitable hydrolyzing agent or catalyst such as alkali or mineral acid. The hydrolysis may be partial or complete, depending on the nature of the solvent, the amount and kind of catalyst used, and the time and temperature of reaction. The following general principles apply: (1) The greater the amount of vinyl ester in the interpolymer, the more rapid the rate of hydrolysis; (2) alkali hydrolyzing agents give more rapid rates of hydrolysis than mineral acid catalysts.

The term "hydrolysis" as used herein and in the accompanying claims is intended to include alcoholysis as well as hydrolysis with the use of water. Regardless of whether water or an alcohol is used to split off the ester groups in the interpolymer, the product is the same.

Complete hydrolysis can be obtained in most cases by dissolving the interpolymer in alcohol or alcohol-toluene to give about a 10% solution, adding an excess of sodium or potassium hydroxide in alcohol and refluxing for about one hour. Those interpolymers having a mole ratio of vinyl ester to ethylene not greater than 2:1 will remain in solution throughout the process. Interpolymers having higher vinyl ester contents become insoluble in the reaction mixture as hydrolysis proceeds. The hydrolyzed products can be separated from the solvent by steam distillation or, if insoluble, by simple filtration. Completely hydrolyzed products thus obtained can be pressed between heated plates or cast from suitable solvents to give films. Such films are much stiffer and tougher than films from the unhydrolyzed interpolymer and generally also have much higher softening temperatures. These films are all insoluble in water. They are thus much less water-sensitive than polyvinyl alcohol films. However, they still retain the characteristic resistance of polyvinyl alcohol to hydrocarbons and other organic solvents.

In many instances it is desirable to stop the hydrolysis short of completion. The hydrolysis can be controlled so that it proceeds to the extent of only 80-95%, i. e., until 80-95% of the ester groups have been replaced by hydroxyl groups. This control can be accomplished by such expedients as using an acid catalyzed alcoholysis with sulfuric acid and ethyl or methyl alcohol, or using less than the theoretical amount of caustic, or controlling the time and temperature of reaction suitably. The exact conditions to use to obtain a given degree of hydrolysis will, of course, vary with the vinyl ester content of the interpolymer used.

Both the partially and completely hydrolyzed products can be converted into fibers by melt or solvent spinning. Although it has proved impossible to melt spin polyvinyl alcohol, the polyalcohols of this invention containing as little as 10% by weight of ethylene can be readily melt spun. In addition, many of the hydrolyzed interpolymers can be spun from a solution in an organic solvent, such as alcohol.

In a preferred method of etherifying a hydrolyzed interpolymer of ethylene and a vinyl organic ester the hydrolyzed interpolymer is made into a paste with water, alcohol, and aqueous potassium or sodium hydroxide. An excess of sodium or potassium chloroacetate is mixed into the paste and the resultant mixture agitated at room temperature for about 15 hours. A second amount of sodium or potassium chloroacetate is mixed into the paste and agitation continued for 2 days longer. The resultant reaction mixture is a homogeneous paste that is completely dissolved by the addition of water. The solution of the paste in water is dialyzed for 2 days, after which time the water solution does not form a precipitate with silver nitrate. It is filtered and the water evaporated to obtain the sodium glycolate ether of the hydrolyzed vinyl ester interpolymer. The free glycolic acid ether is formed by acidification of this sodium glycolate ether of the hydrolyzed vinyl ester interpolymer with dilute hydrochloric acid followed by dialysis of the resultant solution and finally by evaporation of the dialyzed solution to dryness.

The following example, which illustrates the preparation of a glycolic ether of a hydrolyzed ethylene/vinyl acetate interpolymer in which the mol ratio of ethylene to vinyl acetate is 1/25, is given for illustrative purposes and is not intended to place any restrictions or limitations on the herein described invention. Proportions are given in parts by weight, unless otherwise specified.

Into a reaction vessel fitted with an agitator is introduced 5 parts of a hydrolyzed 1/25 ethylene/vinyl acetate interpolymer. To the vessel is added 25 parts of water and 19.7 parts of alcohol. The resultant mixture is agitated at ordinary temperatures until the hydrolyzed interpolymer dissolves, an operation which may take several hours. At the end of this time 20 parts of 40% aqueous potassium hydroxide solution is added to the reaction mixture. The addition of aqueous alkali causes the separation of gel-like particles of hydrolyzed interpolymer. At this point 25 parts of sodium chloroacetate is added to the agitated mixture in small portions over a period of ½ hour.

Agitation is continued at room temperature for 15 hours longer after which time another 25 parts of sodium chloroacetate is added in small portions over a 1 hour period. Stirring is continued for 54 hours longer after which time the reaction mixture is a white, homogeneous, water-soluble paste. This paste is dissolved in warm water and dialyzed through a membrane fabricated from cellulose film.

After dialysis the solution contains a small amount of insoluble material which is removed by filtration but does not form a precipitate when treated with dilute, aqueous silver nitrate solution. The dialyzed solution is concentrated by evaporation and cast into a film. The film softens at 195–200° C. and contains 5.46% sodium. Acidification of an aqueous solution of the sodium glycolate ether of the hydrolyzed 1/25 ethylene/vinyl acetate interpolymer with dilute hydrochloric acid followed by dialysis for 2 days through a cellulose membrane, and evaporation of the dialyzed solution to dryness yields the free glycolic acid ether whose neutral equivalent is 7450. Calculation shows that 24.3% of the hydroxyl groups have reacted to form glycolic acid ether groups. This polyacid can be cast from aqueous solution into films that soften at 150–155° C. and have tensile strengths of 7928 lbs./sq. in.

While this invention has been illustrated with specific reference to water-soluble ethers of hydrolyzed ethylene/vinyl acetate interpolymers, it is of course not so limited but applies broadly to water-soluble ethers of hydrolyzed interpolymers of ethylene with any vinyl organic ester, such as vinyl acetate, vinyl isobutyrate, vinyl pimelate, vinyl butyrate, vinyl 2-ethyl hexanoate, vinyl propionate and vinyl benzoate. However, since the water-soluble ethers of this invention are most economically prepared from the ethylene/ vinyl acetate interpolymers, their employment is preferred.

The molecular proportions of ethylene to vinyl organic ester in the interpolymer subjected to hydrolysis and subsequent etherification may vary within wide limits depending upon the properties desired in the polymeric ether product. It is to be understood, however, that the mol ratio of ethylene to vinyl organic ester in said interpolymer should be not greater than 8/1 in order to provide ethers having appreciable water-solubility.

Hydrolysis of the interpolymer of ethylene and a vinyl organic ester is preferably effected in the manner described in U. S. application Serial No. 446,114, filed June 6, 1942, now abandoned. The extent to which said interpolymer must be hydrolyzed in order to permit the production of ethers having satisfactorily high water-solubility will vary within relatively wide limits, depending upon the vinyl organic ester in the interpolymer, the ratio of ethylene to vinyl organic ester, the degree of etherification of the hydrolyzed interpolymer and the etherification agent employed, and the use requirements of the resultant ether. However, in order to provide water-soluble products said interpolymer should be at least 50% hydrolyzed, i. e., at least 50% of the ester groups in said interpolymer should be replaced by hydroxyl groups. In most instances the maximum advantages of this invention are obtained when the interpolymer subjected to etherification is substantially completely hydrolyzed, i. e., from 95% to 100% of the ester groups are replaced by hydroxyl groups.

The polyalcohols obtained by hydrolysis of the aforementioned vinyl ester interpolymers contain aliphatic hydroxyl groups and not phenolic groups. Upon etherification in accordance with this invention with a salt of an alpha halo fatty acid dissolved in an aqueous solution of a base having a basic dissociation constant of at least $2 \times 10^{-5}$, said salt having the general formula

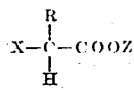

wherein X is a halogen atom having an atomic weight greater than 30, R is a radical selected from the group consisting of hydrogen atoms and monovalent alkyl radicals containing not more than 4 carbon atoms, and Z is a cation of a base having a basic dissociation constant of at least $2 \times 10^{-5}$, there is obtained a glycolic ether, namely, a glycolate ether, hydroxyl radicals of the hydrolyzed interpolymer being replaced by radicals having the general formula

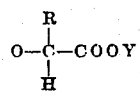

wherein R is a radical selected from the group consisting of hydrogen atoms and monovalent alkyl radicals containing not more than 4 carbon atoms, and Y is a cation of a base having a basic dissociation constant of at least $2 \times 10^{-5}$. The reactions involved in the aforementioned process are represented below. For convenience of illustration the reactions are presented for etherification of a completely hydrolyzed ethylene/vinyl organic ester interpolymer by reaction with an aqueous alkaline sodium hydroxide solution of chloroacetic acid, i. e., an aqueous sodium hydroxide solution of sodium chloroacetate.

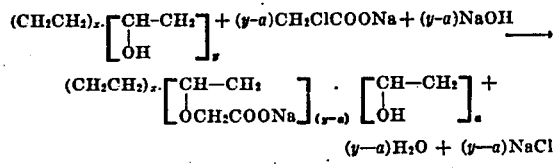

In this equation $x$ and $y$ are positive integers whose size depend upon the molecular weight of the interpolymer and the relative amounts of ethylene and vinyl organic ester (hydrolyzed) present. The molar ratio of ethylene to vinyl ester represented in the interpolymer is $x/y$. Also, in this equation, $a$ is a positive integer smaller than $y$.

The glycolic ethers of this invention vary widely in such properties as water solubility, tensile strength, softening point, and cold crack temperatures of cast films. These properties can be adjusted readily since they depend upon the degree of etherification and the mol ratio of ethylene to vinyl ester in the original hydrolyzed interpolymer.

While appreciable effects are had when the mol ratio of ethylene to vinyl organic ester in the interpolymer subjected to hydrolysis and subsequent etherification is as high as 8/1, it is desirable, in the preparation of glycolic ethers, that the mol ratio of ethylene to vinyl ester should be within the range of from 1/25 to 1/1. Hydrolyzed interpolymers in which said mol ratio is greater than 1/1 are not readily soluble in the mixture of alcohol and water preferably employed in the preparation of glycolate ethers, and hence are not easily converted into said ethers. Furthermore, ethers of hydrolyzed interpolymers in which said mol ratio is less than 1/25 do not provide the advantages had with ethers in which said mol ratio is 1/25 or more, in that they are too soluble in water for most purposes. Compositions in which said ratio is about 1/1 have best solubility properties for such applications as textile sizes, whereas compositions in which this ratio is about 1/25 are best suited to uses such as adhesives.

The properties of the glycolic ether may also be varied within rather wide limits depending upon the extent to which the ethylene/vinyl organic ester interpolymer is hydrolyzed prior to etherification thereof. In general, the more highly hydrolyzed the interpolymer, the greater the water-solubility of the resultant ether. When the mol ratio of ethylene to vinyl organic ester in the interpolymer is as high as about 1/1 said interpolymer should be substantially completely hydrolyzed prior to etherification, i. e., at least 95% of the ester groups should be replaced by hydroxyl groups; whereas when said mol ratio is as low as about 1/25 water-soluble ethers may be had from interpolymers in which the degree of hydrolysis is as low as 50%.

As hereinbefore stated, the etherifying agent which may be employed for the production of glycolate ethers is a salt of an alpha halo fatty acid dissolved in an aqueous solution of a base having a basic dissociation constant of at least $2\times 10^{-5}$, said salt having the general formula

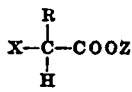

wherein X is a halogen atom having an atomic weight greater than 30, R is a radical selected from the group consisting of hydrogen atoms and monovalent alkyl radicals containing not more than 4 carbon atoms, and Z is a cation of a base having a basic dissociation constant of at least $2\times 10^{-5}$. Examples of bases having a basic dissociation constant of at least $2\times 10^{-5}$ are: ammonia, trimethyl amine, methyl amine, dimethylamine, and butyl amine.

It is to be understood, however, that optimum results are only obtained when the etherifying agent employed is a salt of an alpha halo fatty acid dissolved in an aqueous solution of a strong base, i. e., a base having a basic dissociation constant of at least $1\times 10^{-2}$, and said salt has the general formula

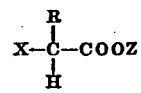

wherein X is a halogen atom having an atomic weight greater than 30, R is a radical selected from the group consisting of hydrogen atoms and monovalent alkyl radicals containing not more than 4 carbon atoms, and Z is a cation of a base having a basic dissociation constant of at least $1\times 10^{-2}$, i. e., Z is a cation of a strong base. Examples of bases having a basic dissociation constant of at least $1\times 10^{-2}$ are: barium hydroxide, sodium hydroxide, potassium hydroxide, and quaternary ammonium hydroxides, such as tetramethyl ammonium hydroxide. Alkali metal hydroxides, particularly potassium hydroxide, are preferred bases, in view of the superior glycolate ethers had therewith. Included among examples of salts of alpha halo fatty acids adapted for use in my process are the barium, sodium, potassium and tetramethyl ammonium salts of chloroacetic, bromoacetic, α chloropropionic, α bromobutyric and α chloroisovaleric acids. Since the reaction proceeds more smoothly therewith, the preferred salt of an alpha halo fatty acid is an alkali metal salt of a haloacetic acid in which the halo atom has an atomic weight greater than 30, e. g., sodium chloroacetate and sodium bromoacetate. The gram equivalent ratio of base to salt of halo fatty acid in the reaction mixture should be at least 1/1; and for optimum results should be in excess of about 1.5/1.

The degree of etherification may be varied within rather wide limits. For instance, appreciable effects are had when as little as about 1% of the hydroxyl groups of the hydrolyzed interpolymers are etherified. However, it is preferred, because of the superior products thereby obtained, that at least 10% but not more than 60% of the hydroxyl groups of the hydrolyzed interpolymer should be etherified, i. e., the ratio of $(y-a)$ to $y$ in the above equation should be within the range of from 1/10 to 6/10.

The glycolic ether obtained by the aforementioned process is a glycolate ether. The corresponding free glycolic acid ether may be formed by acidification of the glycolate ether. The reactions involved in this acidification are represented below. For convenience of illustration the reactions are presented for acidification with hydrochloric acid of a completely hydrolyzed ethylene/vinyl organic ester interpolymer in which 50% of the hydroxyl groups of said hydrolyzed interpolymer have been replaced by sodium glycolate ether groups having the formula OCH₂COONa.

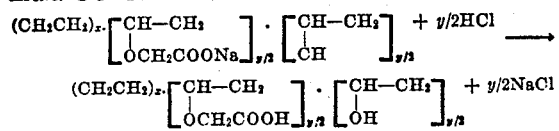

In this equation $x$ and $y$ are positive integers whose size depend upon the molecular weight of the interpolymer and the relative amounts of ethylene and vinyl organic ester (hydrolyzed) present in the hydrolyzed interpolymer subjected to etherification.

The properties of the free acid ethers vary in the same manner as the glycolate ethers but to a different degree. For example, with glycolic acid ethers softening points are lower and cast films are not as brittle as those from the corresponding sodium glycolate ethers.

A wide variety of glycolate ethers, i. e., salts of glycolic acid ethers of hydrolyzed ethylene/vinyl ester interpolymers, may be prepared by etherification of a hydrolyzed ethylene/vinyl ester interpolymer with the appropriate salt of alpha halo fatty acid, or by neutralization of a glycolic acid ether with the desired base, or by other double decomposition reactions, as by admixing an aqueous solution of a barium glycolate ether and an aqueous solution of zinc sulfate or aluminum sulfate, thereby producing the corresponding zinc or aluminum glycolate ether, and precipitated barium sulfate. In this manner salts of alkali metals, such as sodium and potassium, alkaline earth metals, such as magnesium, calcium and barium, as well as salts of zinc, aluminum, and amines, can be prepared.

While the production of the glycolic ethers of this invention has been described with particular reference to the synthesis of water-soluble glycolic ethers from ethylene/vinyl organic ester interpolymers in which the mol ratio of ethylene to vinyl ester is not more than 8/1, it is contemplated that interpolymers, particularly ethylene/vinyl acetate interpolymers, in which the mol ratio of ethylene to vinyl ester is greater than 8/1, e. g., 15/1 or 20/1, may be hydrolyzed and reacted with an alkali metal hydroxide solution of an alkali metal chloro-acetate to provide an alkali metal glycolate ether which, as such, or when acidified to produce the corresponding glycolic acid ether, would form a thermal setting adhesive.

Also useful in the preparation of ethers of hydrolyzed ethylene/vinyl organic ester interpolymers are chloromethyl ether, chloroacetone, 2-chloroethanol, and the like.

The etherification reactions of this invention may be carried out in a variety of reaction chambers, the nature of which is not a part of this invention. It is, however, important that adequate agitation and temperature control be maintained. The reaction is preferably effected at a temperature within the range of from 20° C. to 60° C. since products having optimum properties are thereby obtained. However, higher temperatures of up to 200° C. may be employed, in which case the reaction time is reduced.

The glycolic ethers of hydrolyzed ethylene/vinyl organic ester interpolymers of this invention are useful as a new class of polymeric materials. The glycolic acid ethers and their salts can be employed as sizes for textile fibers and papers, tanning agents, and as a new class of water-soluble film-forming compositions.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A glycolic ether of a hydrolyzed interpolymer of ethylene and vinyl acetate, said ether being that had by replacing by hydroxyl groups at least 50% of the acetate groups of an interpolymer of ethylene and vinyl acetate in which the mol ratio of ethylene to vinyl acetate is within the range of from 1/25 to 8/1, and replacing from 1% to 60% of the hydroxyl groups of the resultant hydrolyzed interpolymer by radicals having the general formula

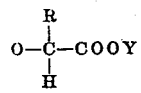

wherein R is a radical selected from the group consisting of hydrogen atoms and monovalent alkyl radicals containing not more than 4 carbon atoms, and Y is a cation selected from the group consisting of hydrogen atoms and salt forming cations from the group consisting of zinc, aluminum and cations of bases having a basic dissociation constant of at least $2 \times 10^{-5}$.

2. A water-soluble glycolic ether of a hydrolyzed interpolymer of ethylene and vinyl acetate, said ether being that had by replacing by hydroxyl groups at least 95% of the acetate groups of an interpolymer of ethylene and vinyl acetate which the mol ratio of ethylene to vinyl acetate is within the range of from 1/25 to 1/1, and replacing from 10% to 60% of the hydroxyl groups of the resultant hydrolyzed interpolymer by radicals having the general formula

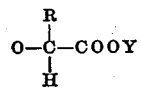

wherein R is a radical selected from the group consisting of hydrogen atoms and monovalent alkyl radicals containing not more than 4 carbon atoms, and Y is a cation selected from the group consisting of hydrogen atoms and salt forming cations from the group consisting of zinc, aluminum and cations of bases having a dissociation constant of at least $2 \times 10^{-5}$.

3. A water-soluble glycolic acid ether of a hydrolyzed interpolymer of ethylene and vinyl acetate, said ether being that had by replacing by hydroxyl groups at least 95% of the acetate groups of an interpolymer of ethylene and vinyl acetate in which the mol ratio of ethylene to vinyl acetate is within the range of from 1/25 to 1/1, and replacing from 10% to 60% of the hydroxyl groups of the resultant hydrolyzed interpolymer by radicals having the formula OCH₂COOH.

4. A water-soluble alkali metal glycolate ether of a hydrolyzed interpolymer of ethylene and vinyl acetate, said ether being that had by replacing by hydroxyl groups at least 95% of the acetate groups of an interpolymer of ethylene and vinyl acetate in which the mol ratio of ethylene to vinyl acetate is within the range of from 1/25 to 1/1, and replacing from 10% to 60% of the hydroxyl groups of the resultant hydrolyzed interpolymer by radicals having the general formula OCH₂COOY wherein Y is an alkali metal cation.

5. A water-soluble alkali metal glycolate ether as defined in claim 4 wherein Y is sodium.

6. A water-soluble alkali metal glycolate ether as defined in claim 4 wherein Y is potassium.

7. The process of preparing a glycolic ether of a hydrolyzed interpolymer of ethylene and vinyl acetate, which comprises admixing a hydrolyzed interpolymer of ethylene and vinyl acetate with a salt of an alpha halo fatty acid dissolved in an aqueous solution of a base having a basic dissociation constant of at least $2 \times 10^{-5}$, said salt having the general formula

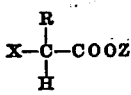

wherein X is a halogen selected from the group consisting of chlorine and bromine atoms, R is a radical selected from the group consisting of hydrogen atoms and monovalent alkyl radicals containing not more than 4 carbon atoms, and Z is a cation of a base having a basic dissociation constant of at least $2 \times 10^{-5}$, and said hydrolyzed interpolymer being that had by replacing by hydroxyl groups at least 50% of the acetate groups of an interpolymer of ethylene and vinyl acetate in which the mol ratio of ethylene to vinyl acetate is within the range of from 1/25 to 8/1.

8. The process of preparing a glycolic ether of a hydrolyzed interpolymer of ethylene and vinyl acetate, which comprises admixing, at a temperature within the range of from 20° C. to 200° C., a salt of an alpha halo fatty acid dissolved in an aqueous solution of a base having a basic dissociation constant of at least $2 \times 10^{-5}$, said salt having the general formula

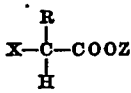

wherein X is a halogen selected from the group consisting of chlorine and bromine atoms, R is a radical selected from the group consisting of hydrogen atoms and monovalent alkyl radicals containing not more than 4 carbon atoms, and Z is a cation of a base having a basic dissociation constant of at least $2 \times 10^{-5}$, with a hydrolyzed interpolymer of ethylene and vinyl acetate, said hydrolyzed interpolymer being that had by replacing by hydroxyl groups at least 50% of the acetate groups of an interpolymer of ethylene and vinyl acetate in which the mol ratio of ethylene to vinyl acetate is within the range of from 1/25 to 8/1.

9. The process of preparing a water-soluble glycolic ether of a hydrolyzed interpolymer of ethylene and vinyl acetate, which comprises admixing, at a temperature within the range of from 20° C. to 60° C., a salt of an alpha halo fatty acid dissolved in an aqueous solution of an alkali metal hydroxide, said salt having the general formula

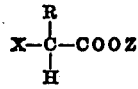

wherein X is a halogen selected from the group consisting of chlorine and bromine atoms, R is a radical selected from the group consisting of hydrogen atoms and monovalent alkyl radicals containing not more than 4 carbon atoms, and Z is an alkali metal cation with a hydrolyzed interpolymer of ethylene and vinyl acetate, said hydrolyzed interpolymer being that had by replacing by hydroxyl groups at least 95% of the acetate groups of an interpolymer of ethylene and vinyl acetate in which the mol ratio of ethylene to vinyl acetate is within the range of from 1/25 to 1/1.

10. The process of preparing a water-soluble glycolic ether of a hydrolyzed interpolymer of ethylene and vinyl acetate, which comprises admixing, at a temperature within the range of from 20° C. to 60° C., an alkali metal salt of a haloacetic acid dissolved in an aqueous solution of an alkali metal hydroxide, said salt having the general formula $XCH_2COOZ$ wherein X is an atom of a halogen having an atomic number of at least 17 and Z is an alkali metal cation, with a hydrolyzed interpolymer of ethylene and vinyl acetate, said hydrolyzed interpolymer being that had by replacing by hydroxyl groups at least 95% of the acetate groups of an interpolymer of ethylene and vinyl acetate in which the mol ratio of ethylene to vinyl acetate is within the range of from 1/25 to 1/1.

11. The process of preparing a water-soluble glycolic ether of a hydrolyzed interpolymer of ethylene and vinyl acetate, which comprises admixing, at a temperature within the range of from 20° C. to 60° C., sodium chloroacetate dissolved in an aqueous solution of potassium hydroxide, with a hydrolyzed interpolymer of ethylene and vinyl acetate, said hydrolyzed interpolymer being that had by replacing by hydroxyl groups at least 95% of the acetate groups of an interpolymer of ethylene and vinyl acetate in which the mol ratio of ethylene to vinyl acetate is within the range of from 1/25 to 1/1.

DONALD D. COFFMAN.

REFERENCES CITED

The following references are of record in the file of this patent:

UNITED STATES PATENTS

| Number | Name | Date |
|---|---|---|
| 2,145,345 | Dreyfus | Jan. 31, 1939 |
| 2,200,429 | Perrin | May 14, 1940 |

Certificate of Correction

Patent No. 2,434,145.                                                              January 6, 1948.

DONALD D. COFFMAN

It is hereby certified that errors appear in the printed specification of the above numbered patent requiring correction as follows: Column 2, line 52, for the words "groups on" read *groups of*; column 10, line 34, claim 2, after "and vinyl acetate" insert *in*; column 12, line 27, claim 10, beginning with the word "an" strike out all to and including "at least 17" in line 29 and insert instead *a halogen selected from the group consisting of chlorine and bromine atoms*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*